United States Patent [19]

Ewald

[11] Patent Number: 4,702,295
[45] Date of Patent: Oct. 27, 1987

[54] METHOD AND APPARATUS FOR MOUNTING PNEUMATIC VEHICLE TIRES

[75] Inventor: Hans Ewald, Hanover, Fed. Rep. of Germany

[73] Assignee: Continental Gummi-Werke Aktiengesellschaft, Hanover, Fed. Rep. of Germany

[21] Appl. No.: 829,392

[22] Filed: Feb. 13, 1986

[30] Foreign Application Priority Data

Feb. 13, 1985 [DE] Fed. Rep. of Germany ....... 3504903

[51] Int. Cl.$^4$ ...................... B60C 25/00; B60C 25/08
[52] U.S. Cl. ........................................ 157/1; 157/1.22
[58] Field of Search ................. 157/1, 1.17, 1.22, 1.24

[56] References Cited

U.S. PATENT DOCUMENTS

| | | | |
|---|---|---|---|
| 3,826,299 | 7/1974 | Curchod | 157/1.17 X |
| 4,173,245 | 11/1979 | Schafer | 157/1.24 |
| 4,516,617 | 5/1985 | Seitz et al. | 157/1 |
| 4,610,288 | 9/1986 | Huinink et al. | 157/1.22 |

FOREIGN PATENT DOCUMENTS

| | | |
|---|---|---|
| 1480989 | 1/1979 | Fed. Rep. of Germany ..... 157/1.17 |
| 3000428 | 3/1984 | Fed. Rep. of Germany . |

Primary Examiner—Frederick R. Schmidt
Assistant Examiner—Debra S. Meislin
Attorney, Agent, or Firm—Becker & Becker, Inc.

[57] ABSTRACT

A method and apparatus for mounting pneumatic vehicle tires, the beads of which have pull and compression resistant bead cores, with the beads, in the mounted state of the tire, being disposed on the radially inner periphery of a wheel rim next to the essentially radially inwardly extending rim flanges of the latter. A mounting mechanism is brought into contact with the peripheral region of a tire bead portion that has been introduced into the rim. The mounting mechanism is introduced in such a way that a first section of the mounting mechanism rests against the tire axially outwardly of the rim flange, while a second section of the mounting mechanism rests against the tire at the level of the rim flange and/or axially inwardly of the rim flange. These two sections of the mounting mechanism define an angle of 80° to 120° relative to one another. While the introduced tire bead portion is held in place against the rim, the mounting mechanism is guided along the periphery of the tire. After the tire and rim have been turned over, the procedure is repeated for the other bead of the tire.

16 Claims, 7 Drawing Figures

METHOD AND APPARATUS FOR MOUNTING PNEUMATIC VEHICLE TIRES

BACKGROUND OF THE INVENTION

1. Field of the Invention

The present invention relates to a method and apparatus for mounting pneumatic vehicle tires, the beads of which have pull and compression resistant bead cores, with the beads, in the mounted state of the tire, being disposed on the radially inner periphery of a wheel rim next to the essentially radially inwardly extending rim flanges of the latter.

2. Description of the Prior Art

German Offenlegungsschrift No. 30 00 428 describes a vehicle wheel where the tire is mounted on the rim in the aforementioned manner. With vehicle wheels of this type, where the tire, in contrast to conventional wheels, is guided around the sides of the rim, and has its beads disposed on the radially inner periphery of the wheel, the tire cannot be mounted on one-piece rims using conventional mounting procedures, nor can the tire be mounted with commercially available apparatus.

In U.S. patent application Ser. No. 653,493, filed Sept. 21, 1984, now U.S. Pat. No. 4,610,288-Huinink et al. dated Sept. 9, 1986 and belonging to the assignee of the present application, a mounting apparatus was proposed with which a tire could be mounted on a vehicle wheel of the aforementioned type using a driven mounting roller. However, this apparatus is rather complicated and expensive, since a motor drive has to be provided for the roller, and since a multiple change of direction of the force transfer is required.

An object of the present invention therefore is to provide a method and an apparatus where a tire can be mounted on vehicle wheels of the aforementioned general type using simple means.

BRIEF DESCRIPTION OF THE DRAWINGS

This object, and other objects and advantages of the present invention, will appear more clearly from the following specification in conjunction with the schematic drawings, in which.

SUMMARY OF THE INVENTION

Figure 1:
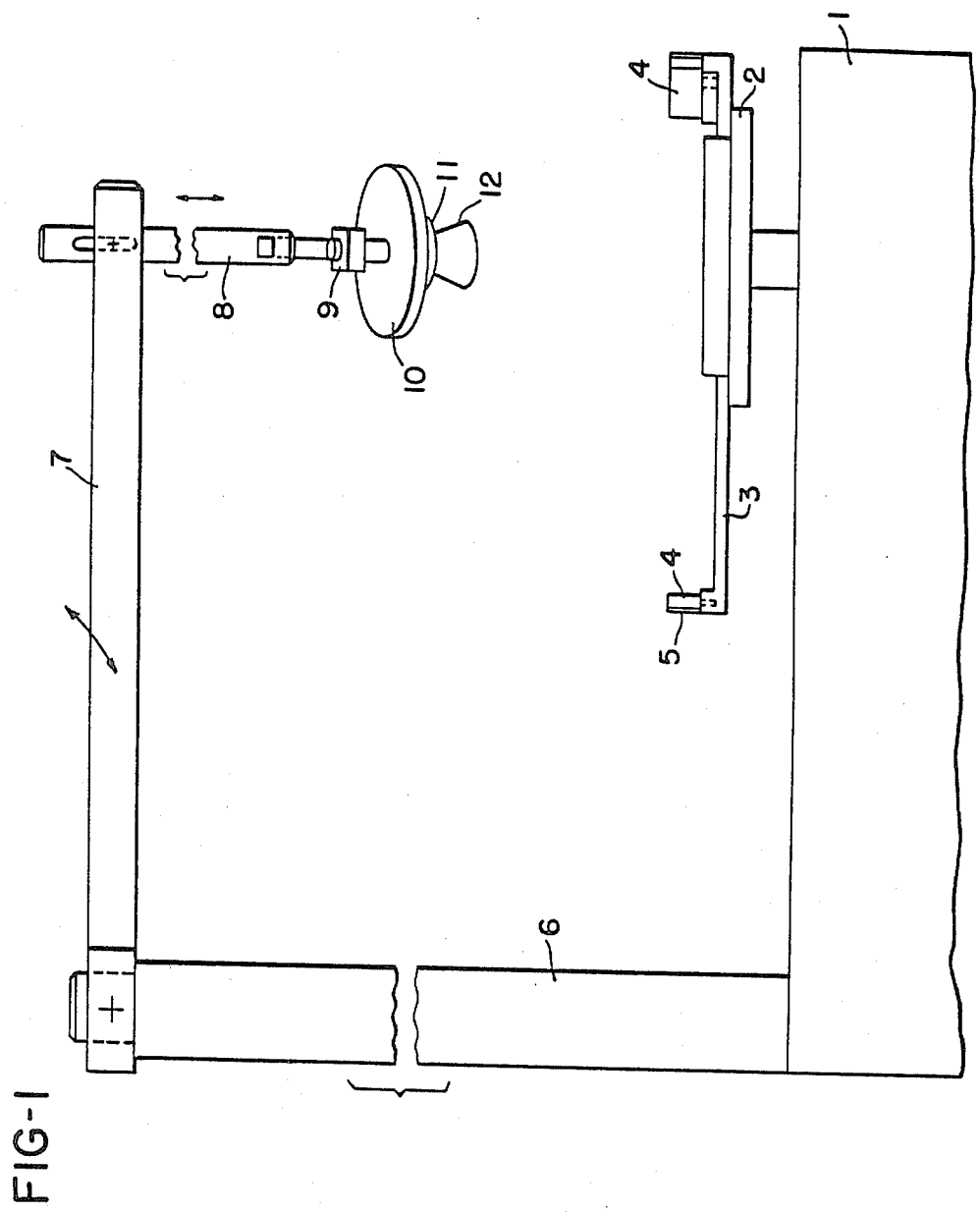
FIG. 1 is a side view of one inventive embodiment of a mounting apparatus having a double conical mounting roller.

The method of the present invention includes the following steps: lifting a portion of one of the tire beads over one of the rim flanges and introducing this bead portion into a mounting space on the radially inner periphery of the rim ring of the wheel rim; bringing a mounting means into contact with the peripheral region of the introduced tire bead portion in such a way that a first section of the mounting means rests against the tire axially outwardly of the rim flange; while a second section of the mounting means rests against the tire at the level of the rim flange and/or axially inwardly of the latter, with the two sections of the mounting means defining an angle of between 80° to 120° relative to one another; while holding the introduced tire bead portion in place against the rim, guiding the mounting means along the periphery of the tire; turning the tire and rim over; and repeating the entire procedure for the other bead of the tire.

One inventive embodiment for carrying out the inventive mounting method comprises, as the mounting means, a non-driven mounting roller which essentially has two sections, with the diameter of at least one of these sections decreasing inwardly in the axial direction of the roller from the outside; the outer surfaces of these two sections of the mounting roller define an angle of between 80° to 120° relative to one another; the mounting roller is guided against a tire bead portion that has been introduced into the interior of the rim, with the mounting roller being guided in such a way that a first one of the sections of the mounting roller rests against the introduced tire bead portion axially outwardly of one of the rim flanges, while a second one of these sections of the mounting roller rests against the introduced tire bead portion at the level of that rim flange and/or axially inwardly of the latter.

A second embodiment of an inventive apparatus for carrying out the method of the present invention comprises, as mounting means, an angle member that has two legs that define an angle of between 80° to 120° relative to one another; the angle member is guided against a tire bead portion that has been introduced into the interior of the rim, with the angle member being guided in such a way that a first one of the legs rests against the introduced tire bead portion axially outwardly of one of the rim flanges, while a second one of the legs of the angle member rests against the introduced tire bead portion at the level of that rim flange and/or axially inwardly of the latter.

Within the framework of the present application, "guiding the mounting means along the periphery of the tire" means that either the mounting means in the mounting position is guided along the periphery of the tire while the tire and rim are fixed in position, or the tire and rim are rotated while the mounting means is fixed in position.

A significant advantage of the present invention is that the numerous commercially available tire mounting apparatus for conventional vehicle wheels can also be used with the system presently under consideration. It is merely necessary to replace the mounting shell of conventional apparatus with either the inventive mounting roller or the inventive angle member, while the entire motor drive and tensioning or holding mechanism for the tire and rim can continue to be used in the same manner as before. The present invention is particularly distinguished by its simplicity, because in technical circles it was previously considered to be absolutely necessary, in order to be able to mount a tire on a vehicle wheel of the aforementioned type, to use a driven roller, the peripheral speed of which had to be greater than the speed with which it rolled off on the tire. The result of these measures was that the tire, in the region of the tire bead, was gradually pushed into the recessed mounting portion (deep bed) by the roller. With the present invention, it was recognized that an adequate mounting possibility could be achieved by utilizing a mounting means having two sections where the first section was placed on the tire axially outwardly of the rim flange, while the second section contacted the tire radially inwardly of the rim flange, with the two sections defining an angle of between 80° and 120° relative to one another. While rotating the tire and the rim, a tire bead and the lower part of the adjacent tire side wall are deflected with such a mounting means in such a way that the tire bead enters the recessed mounting portion. In order to be able to carry out this deflection in as friction-free a manner as possible, it is further proposed pursuant to a preferred embodiment of the present invention that a non-driven mounting roller be used that preferably has a double cone or concave configuration. Among rollers that have proven to be successful are those where the first section has a maximum diameter of about 100 mm, a minimum diameter of about 25 mm, and an axial dimension of about 35 mm, whereas the second section has a maximum diameter of about 25 mm, a minimum diameter of about 25 mm, and an axial extension of about 25 mm. By appropriate selection of the angle of tilt of the roller axis, the second section of the roller can also be approximately cylindrical.

Pursuant to a further preferred embodiment of the present invention, instead of using a roller as the mounting means, an angle member can also be used; the legs of this angle member can be provided with a friction-reducing coating.

Finally, the present invention has the advantage that the proposed mounting means can be used not only with a motor-driven mounting apparatus, but can also be used in conjunction with an extremely simple and inexpensive mounting tool by simply being secured to a mounting rod that guides the mounting means along the tire on the rim.

Further specific features of the present invention will be described in detail subsequently.

DESCRIPTION OF PREFERRED EMBODIMENTS

Referring now to the drawings in detail, the mounting apparatus illustrated in FIG. 1 is provided with a housing 1 for a motor that drives a rotary turntable 2 and operates the tensioning or holding arm 3, which is provided with tensioning or holding jaws 4. These jaws 4 can be provided with a rubber covering 5. Disposed on a column 6 is a rotatable pivot arm 7, the front end of which is provided with a support rod 8. Secured to this support rod 8 is a roller retainer or carrier 9 for a mounting roller 10. The height of the mounting roller 10 can be adjusted so that it can be used for different sized wheels and tires. Furthermore, means can be provided for adjusting the angle of tilt of the roller 10. The mounting roller 10 is essentially provided with two conical sections 11 and 12, with the diameter of these sections decreasing inwardly from the axially outer rim of the roller 10.

Figure 2:
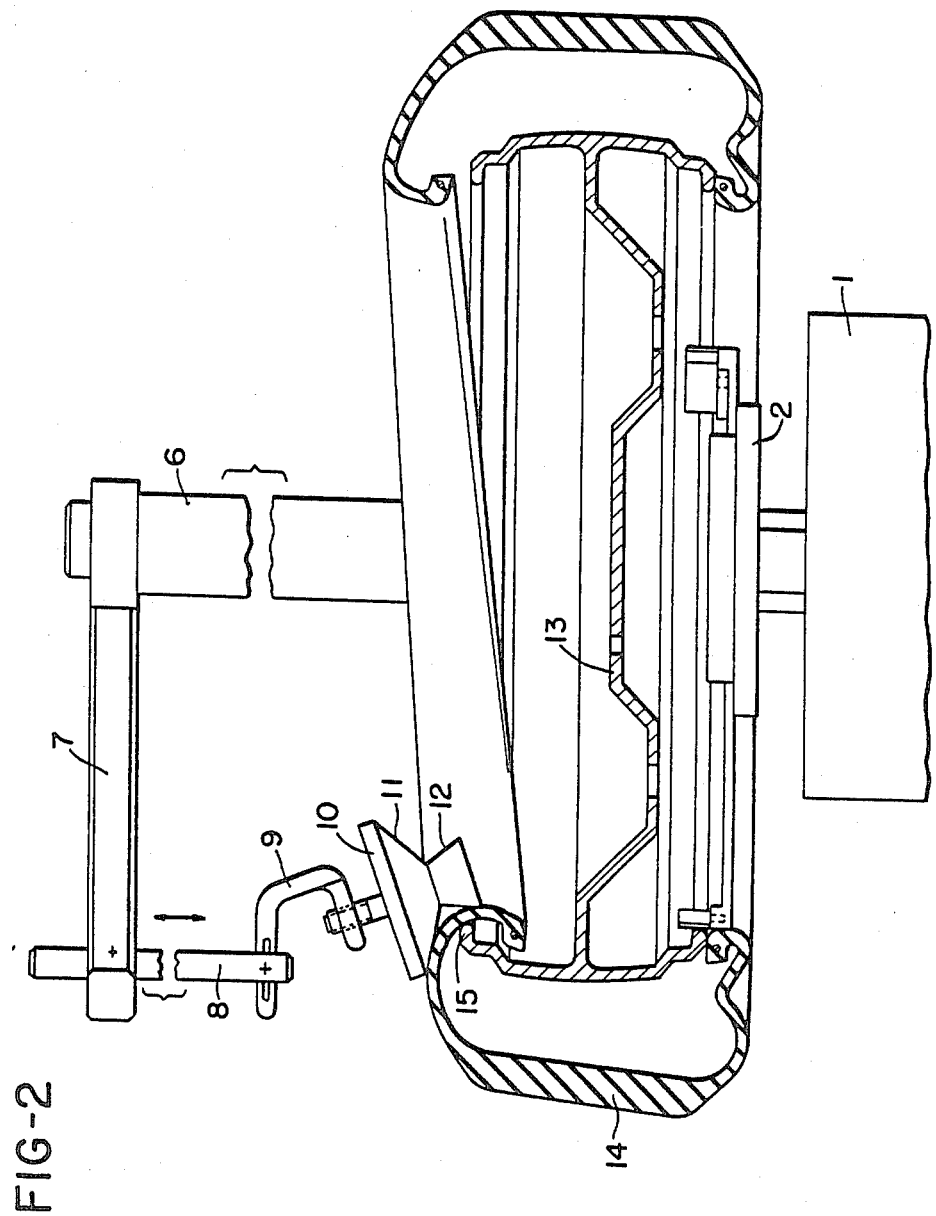
FIG. 2 is a front view of the mounting apparatus of FIG. 1, with the tire and rim being sectioned.

FIG. 2 shows the apparatus of FIG. 1, with a wheel rim 13 placed thereon, and also shows a tire 14. Illustrated is the position of the mounting roller 10 during mounting of the tire. As can be seen, the first section 11 of the mounting roller 10 rests against the tire axially outwardly of the rim flange 15, whereas the second section 12 is disposed at the level of the rim flange 15 and extends partially into the space axially inwardly of the rim flange 15. The conical sections 11, 12 of the mounting roller 10 define an angle that can be between 80° and 120°, and is preferably 95° to 100°. The angle of tilt of the mounting roller 10 should be such that the second section 12 of the roller 10 extends nearly vertically in that region where the section 12 rests against the tire 14; deviations from this angle should not be greater than 20°. Guiding of the roller 10 to the tire is effected with the aid of the pivot arm 7 after the support rod 8 and the roller carrier 9 are first appropriately adjusted.

Figure 3:
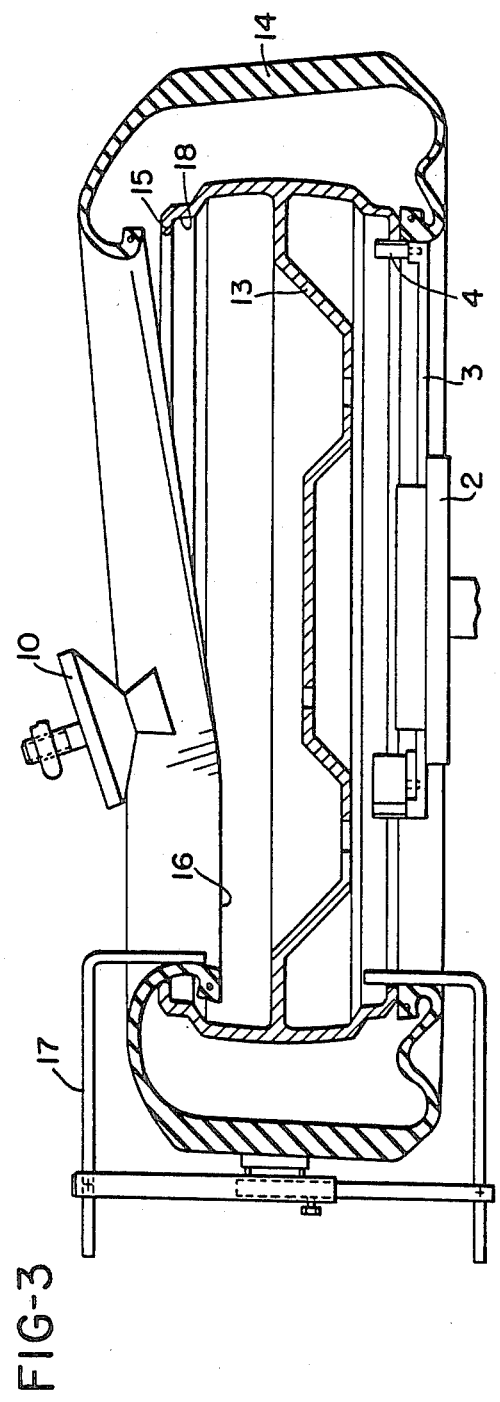
FIG. 3 is a view that shows a portion of the mounting apparatus of FIGS. 1 and 2, and in particular shows a retaining element and a partially mounted tire.

FIG. 3 shows the roller 10 in a position in which a first portion 16 of the upper tire bead is already mounted. A retaining element 17 prevents the tire bead portion 16 that has been introduced into the mounting space from springing out.

The mounting process will now be described in detail. First of all, the tire 14 and the rim 13 are placed upon the mounting apparatus in a position in which the tire beads are disposed laterally outwardly of the rim flanges 15. By extending the holding arms 3, the rim 13 is held in position with the aid of the holding jaws 4.

A first peripheral portion 16 of the upper tire bead is manually introduced into the mounting space behind the upper rim flange 15. This portion 16 is expediently fixed in position with the aid of the retaining element 17, so that this portion 16 cannot spring out during the subsequent mounting of the tire. After this has been accomplished, the mounting roller 10 is guided to the tire 14 in the immediate vicinity of the retaining element 17, thus assuming the position illustrated in FIG. 1; the pivot arm 7 is fixed in this position. Subsequently, with the aid of a conventional switch, the rotary turntable 2 is put in motion, so that the tire 14 and the rim 13 begin to rotate. Due to the inherent stress of the tire 14, the upper tire bead, along with the adjacent tire side wall, are guided or deflected by the roller 10, so that in the peripheral region between the retaining element 17 and the roller 10 this tire bead is lifted over the rim flange 15 and extends into the mounting space. When the rim 13 and the tire 14 have completed approximately one rotation, the entire periphery of the upper tire bead has entered the space behind the upper rim flange 15.

After the retaining element 17 has been released, the mounting roller 10 has been removed, and the holding jaws 4 have been loosened, the rim 13 and the tire 14 are turned, and the second tire bead is mounted in the previously described manner. When the tire is inflated, the tire beads assume their final position upon the seating surfaces 18 that are disposed on the radially inner periphery of the rim 13.

Figure 4:
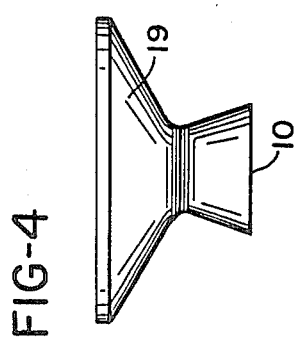
FIG. 4 is a front view of a concave profiled mounting roller.

FIG. 4 shows a further possible embodiment for the mounting roller 10. This embodiment has a concave configuration with a profiling 19 on the outer surface.

Figure 5:
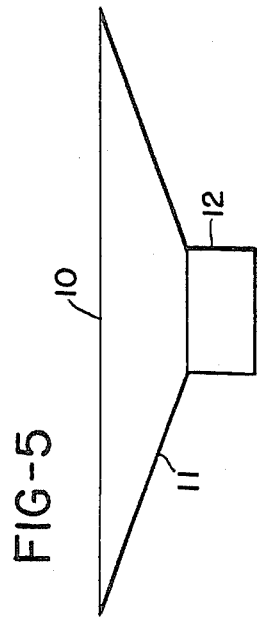
FIG. 5 is a front view of a mounting roller having both a conical and a cylindrical section.

FIG. 5 shows a mounting roller 10 having a conical first section 11 and a cylindrical second section 12. The main thing is that the outer surfaces of the sections 11 and 12 again define an angle of between 80° and 120°.

Figure 6:
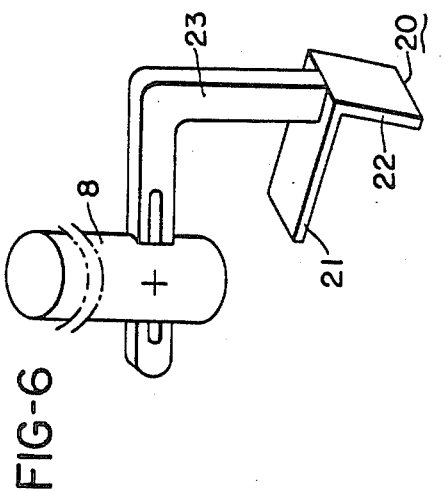
FIG. 6 is a view of an angle member.

FIG. 6 shows a further possible mounting means in the form of an angle member 20 having two legs 21, 22 that again define an angle of between 80° and 120°, and preferably between 95° and 100°. The legs 21, 22 can be provided with a friction-reducing coating, for example of PTFE or polytetrafluoroethylene. The angle member 20 is secured to a holder 23 which in turn is mounted on the apparatus of FIGS. 1 to 3 in place of the roller 10.

Figure 7:
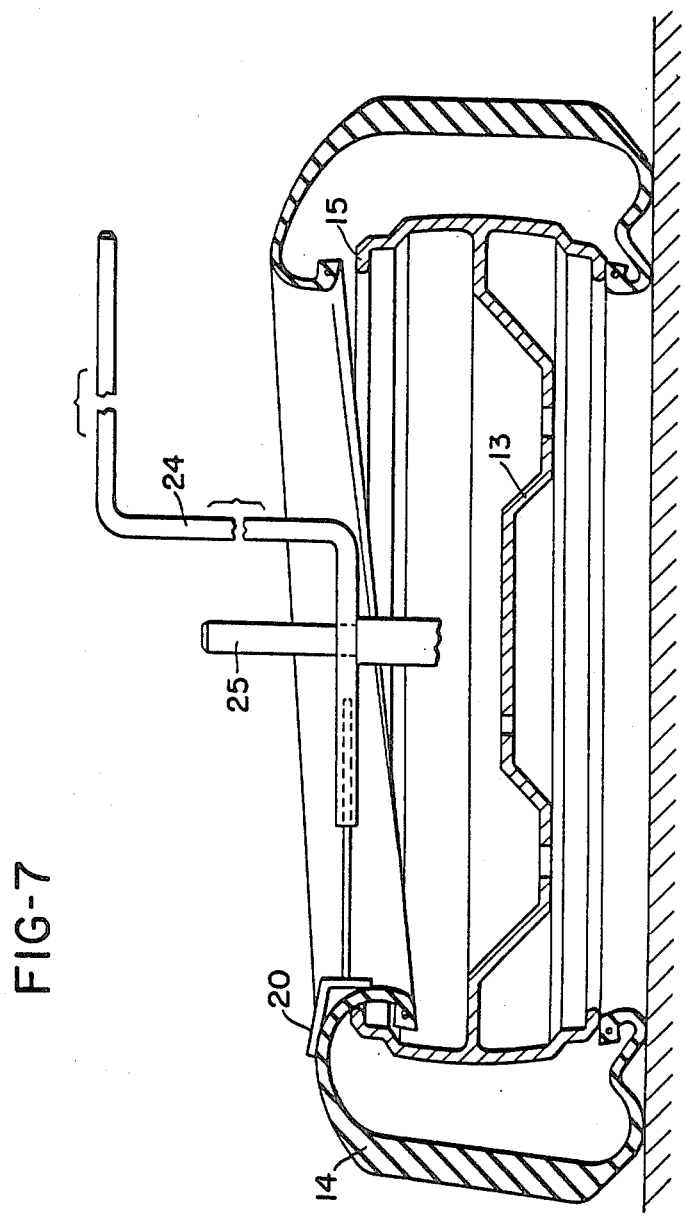
FIG. 7 is a front view of a mounting rod, with the tire and rim being sectioned.

FIG. 7 illustrates a particularly simple mounting apparatus that comprises the previously described angle member and a mounting rod 24 used as a driving means that is rotatable about a guide rod 25. To mount a tire, the guide rod 25 is disposed in the axis of the rim 13. A first peripheral portion of the upper tire bead is again introduced into the interior of the rim 13, where this tire bead portion is fixed in position. After the angle member 20 has been placed in position in the region of this bead portion, the angle member is guided one time along the periphery of the tire with the aid of the rod 24. The second tire bead is mounted in a similar fashion. Prior to mounting, it is advisable to secure the rim 13 with the tire 14 to a base support, for example with the aid of a fixing cone.

In place of the angle member 20, it is naturally also possible to secure the previously described mounting roller 10 on the mounting rod 24.

The present invention is, of course, in no way restricted to the specific disclosure of the specification and drawings, but also encompasses any modifications within the scope of the appended claims.

What I claim is:

1. A method of mounting a pneumatic vehicle tire having an inner space, the beads of which have pull resistant and compression resistant bead cores, with the beads, in the mounted state of the tire, being disposed on a wheel having a radially inwardly extending wheel flange and a radially inner periphery of the rim ring of a wheel rim next to the essentially radially inwardly extending rim flanges of the latter; said method includes the steps of:

lifting a portion of one of said tire beads over one of said rim flanges located completely in the inner space of the tire and introducing this bead portion into a mounting space on the radially inner periphery of said rim ring;

bringing a mounting means which is a non-motorized freely rotatable member into contact with the peripheral region of said introduced tire bead portion in such a way that a first section of said mounting means rests against said tire axially outwardly of the associated rim flange that extends radially inwardly, while a second section of said mounting means rests against said tire at the level of the associated rim flange and axially inwardly of the latter, with said first and second sections defining an angle in a range of from 80° to 120° relative to one another for applying mounting forces to the tire bead portion;

while holding said introduced tire bead portion in place against said rim, guiding said mounting means along the periphery of said tire about the axis of the tire so that the tire bead portion must be pushed radially inwardly over the radially inwardly extending wheel flange;

rotating said mounting means about its own axis by engagement with the tire during said guiding of said mounting means;

removing said mounting means from contact with said tire;

turning said tire and rim over; and repeating said procedure for the other bead of said tire.

2. A method according to claim 1, which includes the step of providing, as said mounting means, a mounting roller that is essentially comprised of said two sections, the diameters of which decrease inwardly in the axial direction from the outside.

3. A method according to claim 1, in which said step of guiding said mounting means along the periphery of said tire is effected by rotating said tire and rim.

4. A method according to claim 1, which includes the step of providing, as said mounting means, an angle member.

5. An apparatus for mounting a pneumatic vehicle tire having an inner space, the beads of which have pull resistant and compression resistant bead cores, with the beads, in the mounted state of the tire, being disposed on a wheel having a radially inwardly extending wheel flange and a radially inner periphery of the rim ring of a wheel rim next to the essentially radially inwardly extending rim flanges of the latter; said apparatus comprises:

a mounting means which is a non-motorized freely rotatable member that essentially has two sections that define an angle in a range of from 80° to 120° relative to one another for applying mounting forces to the tire bead portion means for guiding said mounting means about the axis of the tire against a tire bead portion that has been introduced into the interior of said rim such that said mounting means rotates about its own axis by engagement with the tire during said guiding, with said mounting means being guided in such a way that a first one of said sections of said mounting means rests against said introduced tire bead portion axially outwardly of one of said rim flanges extending radially inwardly, while a second one of said sections of said mounting means rests against said introduced tire bead portion at the level of the rim flange and axially inwardly of the latter so that the tire bead portion must be pushed radially inwardly over the radially inwardly extending wheel flange.

6. An apparatus according to claim 5, in which said mounting means is a mounting roller, with the diameter of at least one of said sections of said roller decreasing inwardly in the axial direction of said roller from the outside; each of said sections of said roller has an outer surface, with these two outer surfaces defining said angle of from 80° to 120°.

7. An apparatus according to claim 6, in which said means for guiding said mounting means against said introduced tire bead portion includes means for driving said rim with said tire thereon.

8. An apparatus according to claim 6, which includes a carrier for holding said mounting roller; and in which said means for guiding said mounting means against said introduced tire bead portion includes means for driving said carrier.

9. An apparatus according to claim 6, in which said mounting roller has a double cone configuration, with said two sections of said roller therefore being conical sections, and defining an angle of from 90° to 100°.

10. An apparatus according to claim 6, in which said mounting roller has a concave configuration, with said two sections of said roller defining an angle of from 90° to 100°.

11. An apparatus according to claim 9, in which one of said sections of said roller has a maximum diameter of about 100 mm, a minimum diameter of about 25 mm, and an axial dimension of about 35 mm.

12. An apparatus according to claim 11, in which the other one of said sections of said roller has a maximum diameter of about 45 mm, a minimum diameter of about 25 mm, and an axial dimension of about 25 mm.

13. An apparatus according to claim 6, in which one of said sections of said sections of said roller is cylindrical.

14. An apparatus according to claim 6, which includes a guide rod that is disposed centrally of said rim; and which includes, as said means for guiding said mounting means against said introduced tire bead portion, a mounting rod that is rotatable about said guide rod, with said mounting roller being secured to said mounting rod.

15. An apparatus according to claim 5, in which said mounting means is an angle member having two legs as said two sections of said mounting means.

16. An apparatus according to claim 15, in which said legs of said angle member are provided with a friction-reducing coating.

* * * * *